US 12,389,393 B2

(12) United States Patent
Panwar et al.

(10) Patent No.: US 12,389,393 B2
(45) Date of Patent: Aug. 12, 2025

(54) UPLINK TRANSMISSION PORT SELECTION

(71) Applicant: QUALCOMM Incorporated, San Diego, CA (US)

(72) Inventors: Neeraj Panwar, San Diego, CA (US); Karan Mahajan, Kapurthala (IN); Deepak Vommi, San Marcos, CA (US); Smruthi Sudhindra, San Diego, CA (US); Pranay Sudeep Rungta, New York, NY (US); Kumarabhijeet Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 18/146,957

(22) Filed: Dec. 27, 2022

(65) Prior Publication Data

US 2024/0215017 A1    Jun. 27, 2024

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ............. H04W 72/1268; H04W 72/23; H04W 72/115; H04B 7/0404; H04L 5/0051
See application file for complete search history.

(56) References Cited

U.S. PATENT DOCUMENTS

2024/0114579 A1* 4/2024 Yao ................. H04W 76/19

FOREIGN PATENT DOCUMENTS

WO    2022/236495 A1    11/2022

OTHER PUBLICATIONS

International Search Report and Written Opinion dated Feb. 6, 2024 from corresponding PCT Application No. PCT/US2023/079091.
Fraunhofer IIS et al: "Enhancements on multi-beam operation", 3GPP Draft; R1-2107464, 3rd Generation Partnership Project (3GPP), Mobile Competence Centre; 650, Route Des Lucioles; F-06921 Sophia-Antipolis Cedex ; France; vol. RAN WG1, No. E-meeting; Aug. 16, 2021-Aug. 27, 2021 Aug. 6, 2021 (Aug. 6, 2021), XP052033563, Retrieved from the Internet: URL:https://ftp.3gpp.org/tsg_ran/WG1_RL1/TSGR1_106-e/Docs/R1-2107464.zip R1-2107464.docx [retrieved on Aug. 6, 2021].

\* cited by examiner

*Primary Examiner* — Kyaw Z Soe
(74) *Attorney, Agent, or Firm* — Arent Fox, LLP

(57) ABSTRACT

Aspects of the disclosure are directed to optimizing transmission at a user equipment (UE) such that configured grant (CG) and dynamic grant (DG) uplink communications are transmitted via the same channel or antenna port. In some examples, the UE may be configured to obtain, from a network node, a first signal activating a configured grant (CG) for uplink communication via a first port of the apparatus. In some examples, the UE may be configured to obtain, from the network node, a second signal indicating a dynamic grant (DG) for uplink communication via a second port of the apparatus. In some examples, the UE may be configured to output, for transmission to the network node, a CG uplink signal via the second port of the apparatus based on the second signal indication of the second port.

20 Claims, 10 Drawing Sheets

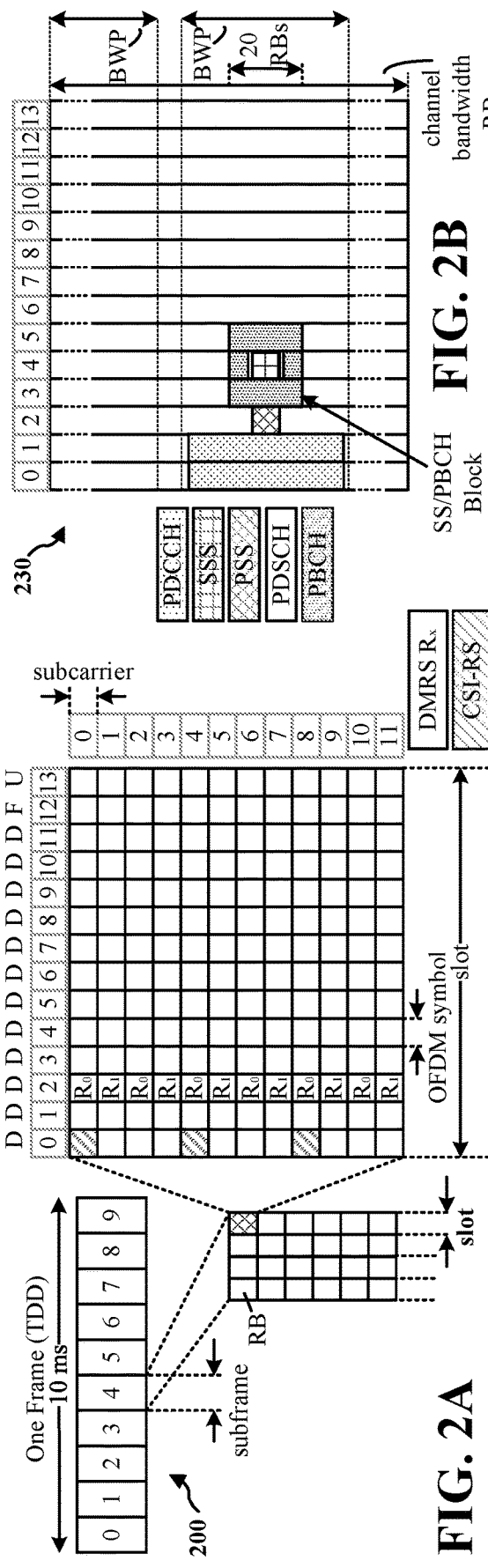
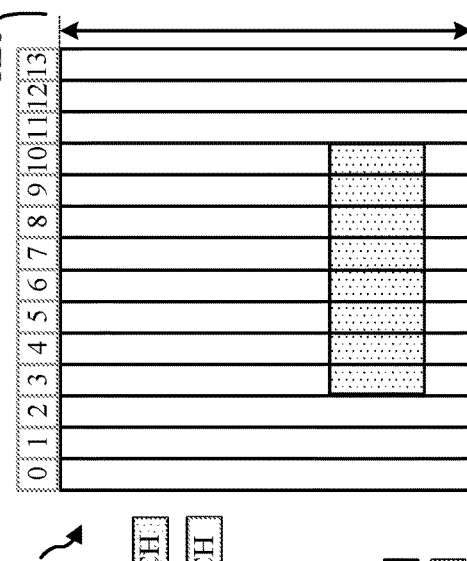
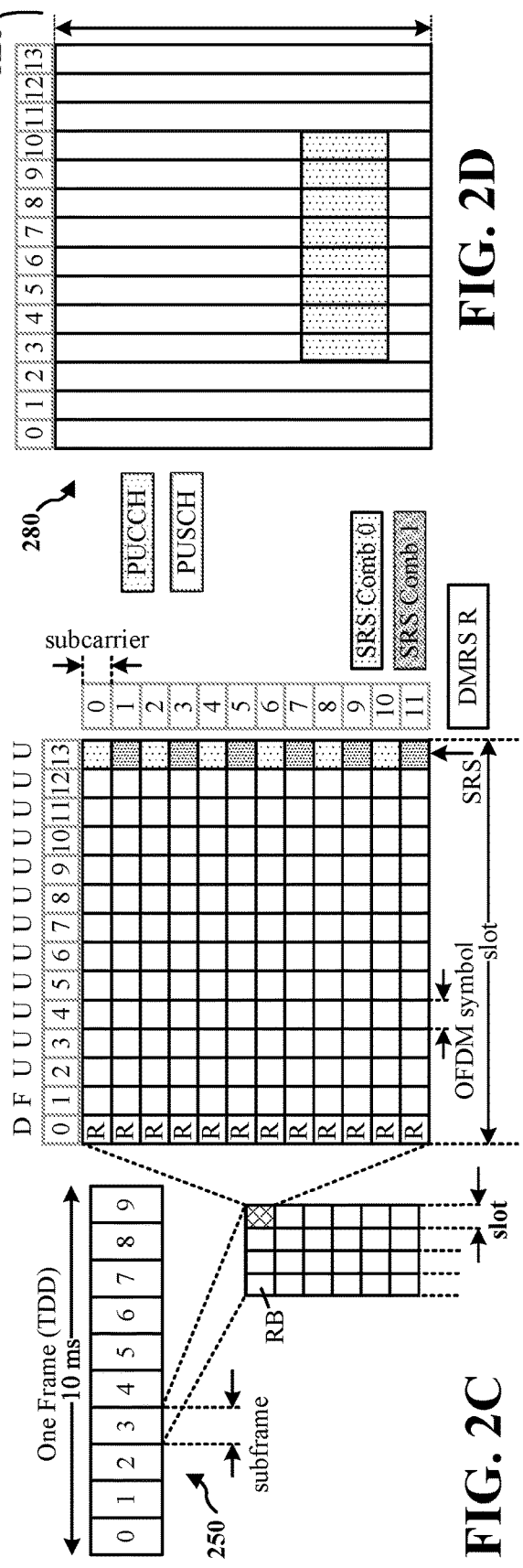
FIG. 2A
FIG. 2B
FIG. 2C
FIG. 2D

UPLINK TRANSMISSION PORT SELECTION

BACKGROUND

Technical Field

The present disclosure generally relates to communication systems, and more particularly, aligning ports used for different types of transmission.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method of wireless communication at an apparatus. In some examples, the method includes obtaining, from a network node, a first signal activating a configured grant (CG) for uplink communication via a first port of the apparatus. In some examples, the method includes obtaining, from the network node, a second signal indicating a dynamic grant (DG) for uplink communication via a second port of the apparatus. In some examples, the method includes outputting, for transmission to the network node, a CG uplink signal via the second port of the apparatus based on the second signal indication of the second port.

Certain aspects are directed to a method of wireless communication at an apparatus. In some examples, the method includes outputting, for transmission to a user equipment (UE), a first signal activating a configured grant (CG) for uplink communication via a first port of the UE. In some examples, the method includes outputting, for transmission to the UE, a second signal indicating a dynamic grant (DG) for uplink communication via a second port of the UE. In some examples, the method includes obtaining, from the UE, a CG uplink signal via the second port of the apparatus based on the second signal indication of the second port.

Certain aspects are directed to an apparatus configured for wireless communication. In some examples, the apparatus includes a memory comprising instructions and one or more processors configured to execute the instructions. In some examples, the instructions are configured to cause the one or more processors to obtain, from a network node, a first signal activating a configured grant (CG) for uplink communication via a first port of the apparatus. In some examples, the instructions are configured to cause the one or more processors to obtain, from the network node, a second signal indicating a dynamic grant (DG) for uplink communication via a second port of the apparatus. In some examples, the instructions are configured to cause the one or more processors to output, for transmission to the network node, a CG uplink signal via the second port of the apparatus based on the second signal indication of the second port.

Certain aspects are directed to an apparatus configured for wireless communication. In some examples, the apparatus includes a memory comprising instructions and one or more processors configured to execute the instructions. In some examples, the instructions are configured to cause the one or more processors to output, for transmission to a user equipment (UE), a first signal activating a configured grant (CG) for uplink communication via a first port of the UE. In some examples, the instructions are configured to cause the one or more processors to output, for transmission to the UE, a second signal indicating a dynamic grant (DG) for uplink communication via a second port of the UE. In some examples, the instructions are configured to cause the one or more processors to obtain, from the UE, a CG uplink signal via the second port of the apparatus based on the second signal indication of the second port.

Certain aspects are directed to an apparatus. In some examples, the apparatus includes means for obtaining, from a network node, a first signal activating a configured grant (CG) for uplink communication via a first port of the apparatus. In some examples, the apparatus includes means for obtaining, from the network node, a second signal indicating a dynamic grant (DG) for uplink communication via a second port of the apparatus. In some examples, the apparatus includes means for outputting, for transmission to the network node, a CG uplink signal via the second port of the apparatus based on the second signal indication of the second port.

Certain aspects are directed to an apparatus. In some examples, the apparatus includes means for outputting, for transmission to a user equipment (UE), a first signal activating a configured grant (CG) for uplink communication via a first port of the UE. In some examples, the apparatus includes means for outputting, for transmission to the UE, a second signal indicating a dynamic grant (DG) for uplink communication via a second port of the UE. In some examples, the apparatus includes means for obtaining, from the UE, a CG uplink signal via the second port of the apparatus based on the second signal indication of the second port.

Certain aspects are directed to a non-transitory computer-readable medium comprising instructions that, when executed by an apparatus, cause the apparatus to perform a method. In some examples, the method includes obtaining, from a network node, a first signal activating a configured grant (CG) for uplink communication via a first port of the apparatus. In some examples, the method includes obtaining, from the network node, a second signal indicating a dynamic grant (DG) for uplink communication via a second port of the apparatus. In some examples, the method includes outputting, for transmission to the network node, a CG uplink signal via the second port of the apparatus based on the second signal indication of the second port.

Certain aspects are directed to a non-transitory computer-readable medium comprising instructions that, when executed by an apparatus, cause the apparatus to perform a method. In some examples, the method includes outputting, for transmission to a user equipment (UE), a first signal activating a configured grant (CG) for uplink communication via a first port of the UE. In some examples, the method includes outputting, for transmission to the UE, a second signal indicating a dynamic grant (DG) for uplink communication via a second port of the UE. In some examples, the method includes obtaining, from the UE, a CG uplink signal via the second port of the apparatus based on the second signal indication of the second port.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
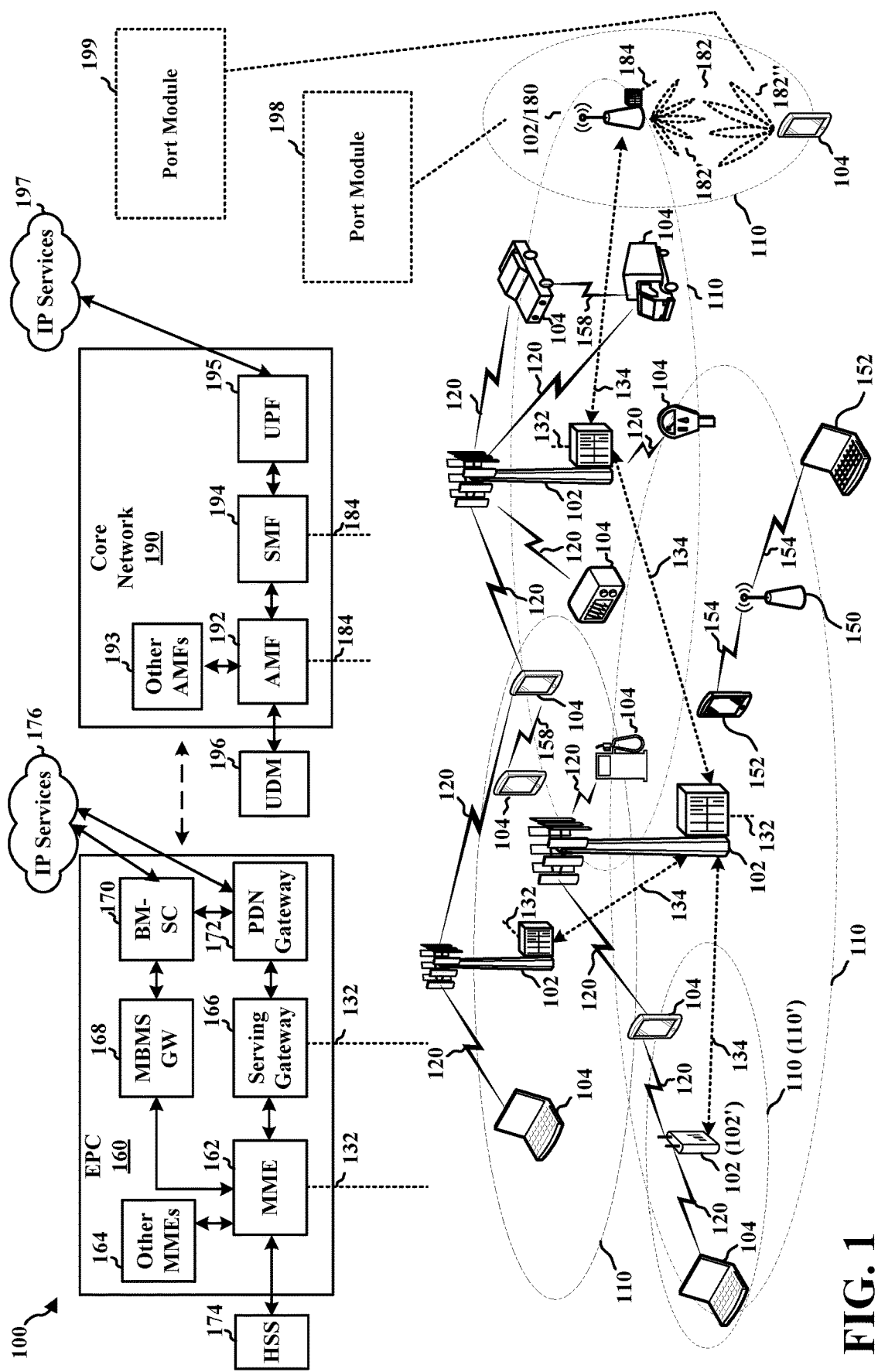
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a user equipment (UE) is in single-input single-output (SISO) mode for uplink transmission (e.g., uplink transmissions are performed via a single antenna port instead of multiple antenna ports), the network can dynamically configure the UE to use a particular antenna for uplink transmissions based on a quality of sounding reference signal (SRSs) received by the network from multiple UE antennas. In some examples, the network may configure the UE such that an SRS transmitted by the UE via one antenna is different from another SRS transmitted via another antenna. In other words, the two SRSs may be configured by the network with codebook usage so that the network can distinguish which SRS is transmitted via which antenna port.

This provides the network with the ability to determine which UE port is transmitting a relatively higher quality SRS by measuring the two SRSs, and the network can then command the UE to use the port corresponding to the higher quality SRS for uplink transmission. For example, the network may receive and decode SRSs received from different UE ports (e.g., port Tx0 and port Tx1), and schedule an uplink transmission via a physical uplink shared channel (PUSCH) by transmitting a downlink control information (DCI) message to the UE, wherein the DCI includes an SRS resource indicator (SRI) field configured to identify the port that the UE is to use for the uplink transmission.

However, the above describes examples of dynamic grants (DGs) for uplink transmissions. The network may also configure the UE for uplink configured grant (CG) via RRC configuration messaging for CG Type 1 or via DCI (e.g., DCI format 0_1) for CG Type 2. Thus, the UE may be configured to use a first port for CG uplink transmissions, while also configured to use a second port for DG uplink transmissions. In such an example, the UE may be transmitting uplink signals via two different ports, wherein one of the ports provides a higher quality signal from the perspective of the network. Moreover, switching between the two ports may require more time and power consumption from the UE.

Accordingly, aspects of the disclosure are directed to techniques for aligning transmission ports for both DG and CG uplink communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with a port module 199 configured to obtain, from a network node, a first signal activating a configured grant (CG) for uplink communication via a first port of the apparatus; obtain, from the network node, a second signal indicating a dynamic grant (DG) for uplink communication via a second port of the apparatus; and output, for transmission to the network node, a CG uplink signal via the second port of the apparatus based on the second signal indication of the second port.

Referring again to FIG. 1, in certain aspects, the base station 102/180 may be configured with a port module 198 configured to receive, via the transceiver, a first signal activating a configured grant (CG) for uplink communication via a first port of the UE; receive, via the transceiver, a second signal indicating a dynamic grant (DG) for uplink communication via a second port of the UE; and transmit, via the transceiver, a CG uplink signal via the second port of the UE based on the second signal indication of the second port.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
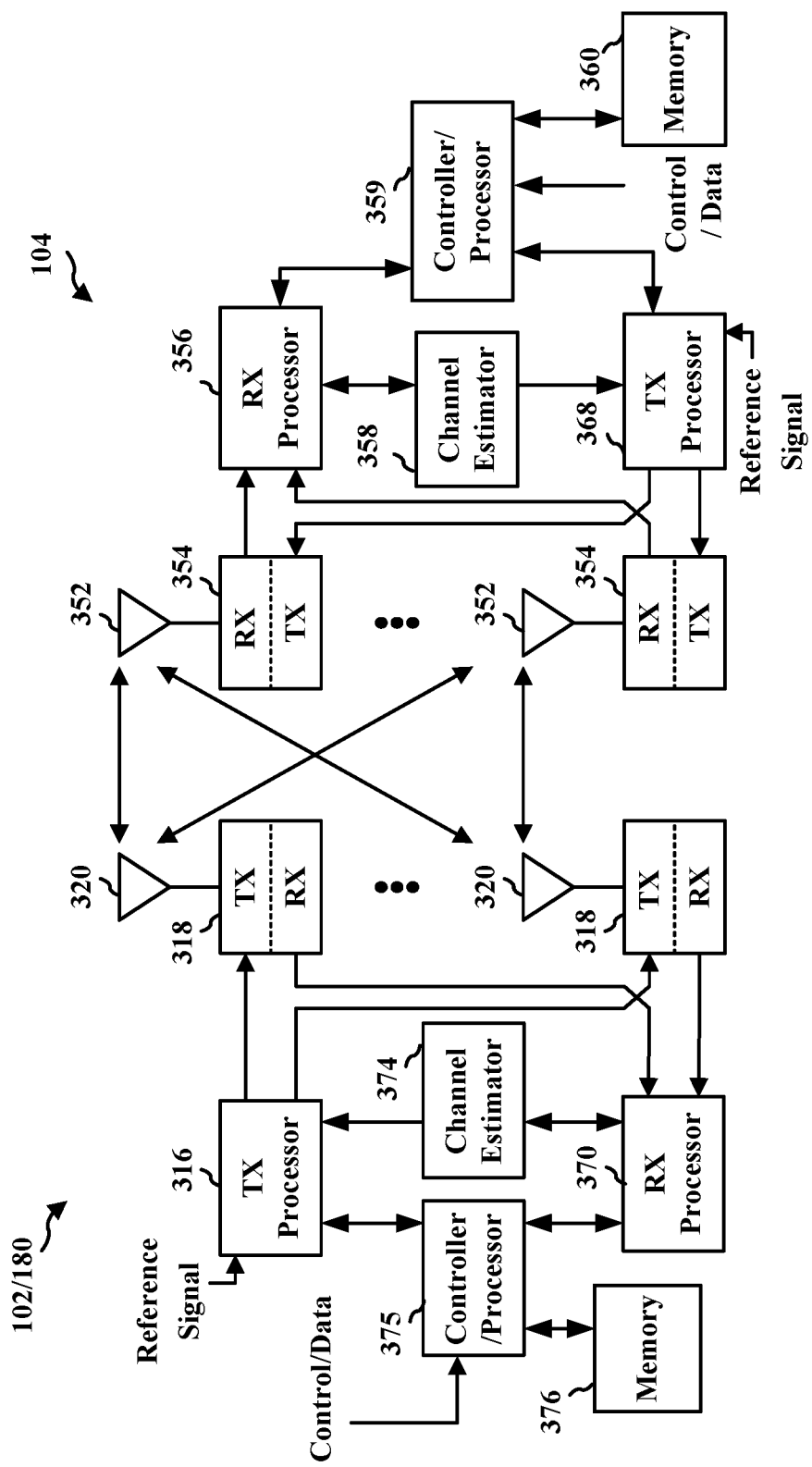
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
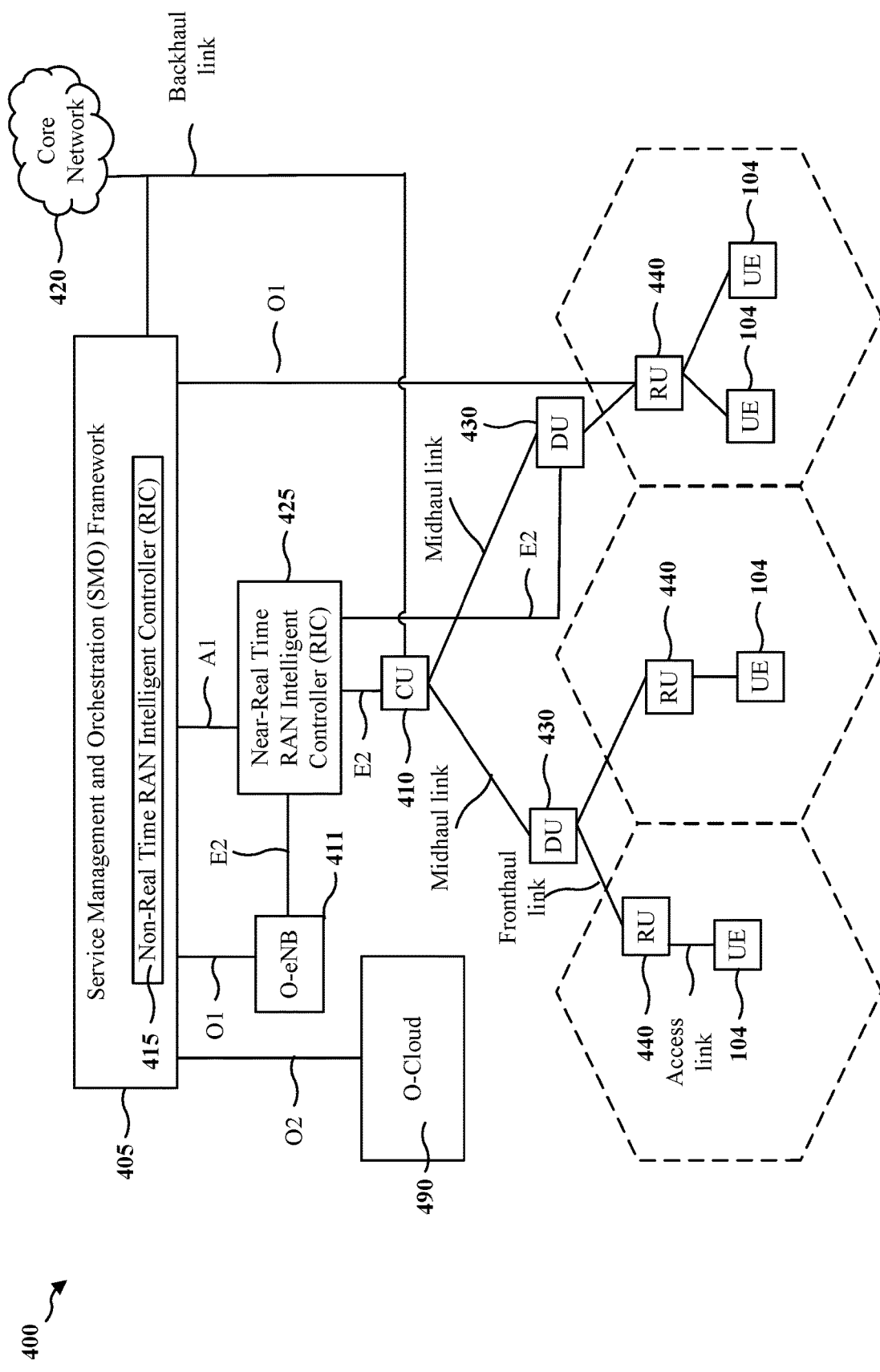
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Examples of Aligning Ports for Different Types of Uplink at a UE

The UE may be configured for SISO mode for uplink transmission (e.g., uplink transmissions are performed via a single antenna port instead of multiple antenna ports). In the case of a DG, the network (e.g., a network node or base station 102/180 or a disaggregated portion of the network node such as an RU/DU as illustrated in FIG. 4) may dynamically configure the UE to use a particular antenna for uplink transmissions based on a quality of SRSs received by the network from multiple UE antennas. In some examples, SRSs may be configured by the network with codebook usage so that the network can distinguish which SRS is transmitted via which antenna port.

Thus, the network may determine which UE port is transmitting a relatively higher quality SRS by measuring the two SRSs, and the network can then command the UE to use the port corresponding to the higher quality SRS for uplink transmission. The network may also configure the UE for uplink CG via RRC configuration messaging for CG Type 1 or via DCI (e.g., DCI format 0_1) for CG Type 2. However, the UE 104 may be configured to use a first port for CG uplink transmissions, while also configured to use a second port for DG uplink transmissions. In such an example, the UE may be transmitting uplink signals via two different ports, wherein one of the ports provides a higher quality signal from the perspective of the network. Moreover, switching between the two ports may require more time and power consumption from the UE.

Figure 5:
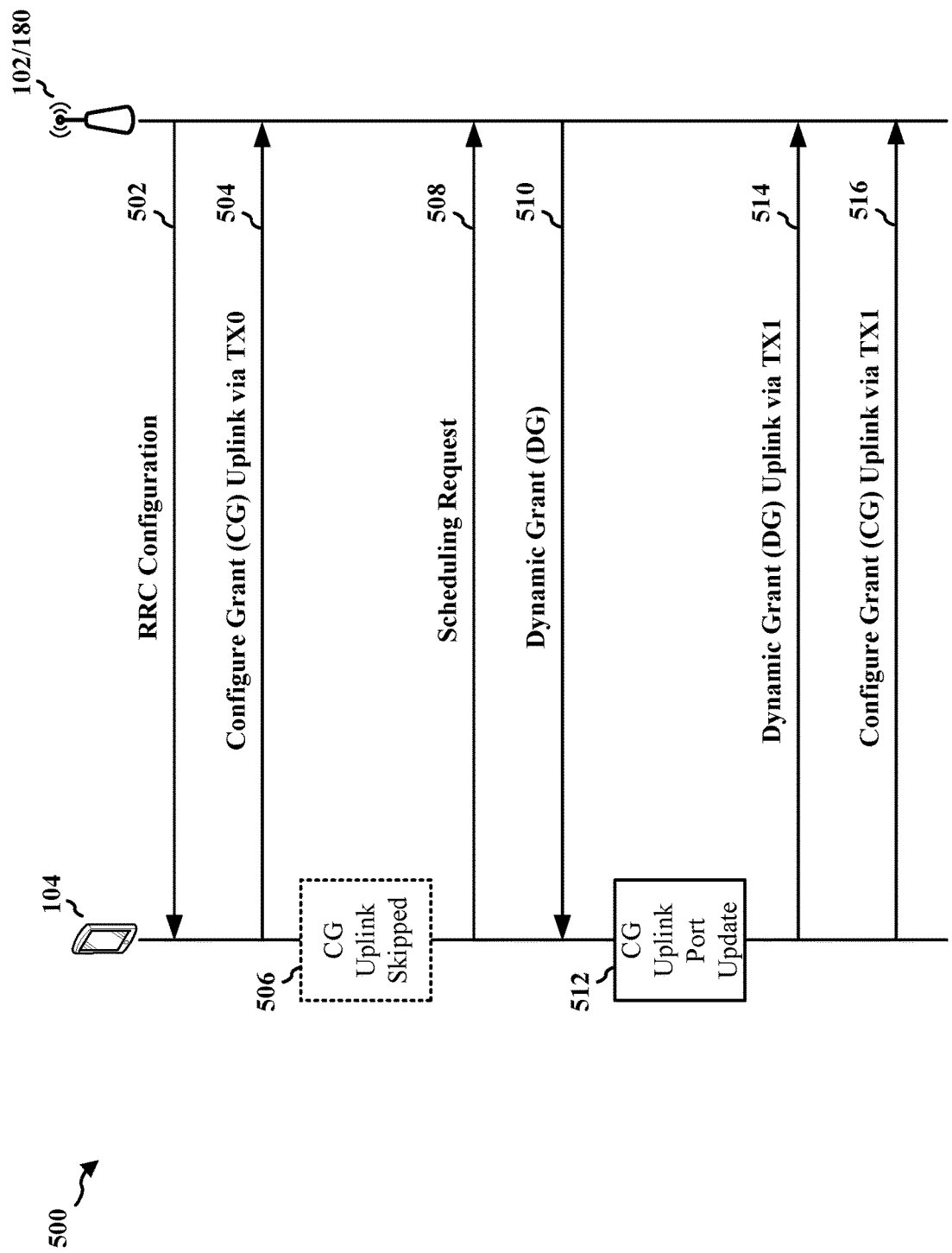
FIG. 5 is a call-flow diagram illustrating example communications between a UE and a network node or base station.

FIG. 5 is a call-flow diagram illustrating example communications between a UE 104 and a network node or base station 102/180.

At a first communication 502, the network node 102 transmits an RRC configuration message and/or other PDCCH signaling to the UE 104, configuring the UE 104 for CG uplink communications. In some examples, the RRC configuration may include an indication of an antenna port (e.g., TX0) that the UE 104 may use for transmitting uplink communications to the network node 102. The CG configuration may provide the UE 104 with a schedule and/or resources for uplink transmissions that eliminates the need for the UE 104 to request and the network node 102 to assign resources for each packet transmission by pre-allocating resources to the UE. In other words, CGs configure the UE 104 for uplink transmissions without the need for the UE to request resources from the network node using an SR. In one example, if there is a voice over new radio (VoNR) call in place at the UE 104, the network node 102 may assign periodic resources using CGs for uplink packets transmitted via an internet protocol (IP) multimedia subsystem (IMS) bearer as long as the call is active.

At a second communication 504, the UE 104 may transmit an uplink signal via TX0 to the network node 102 using CG resources/schedule.

At a first process 506, the UE 104 may optionally skip a CG uplink. That is, if the UE 104 does not have any uplink data to transmit to the network node 102, then the UE 104 may omit an uplink transmission using a CG uplink resource. For example, if a VoNR call or an IMS call has a silent duration, the UE 104 may not have any data to transmit via a CG uplink resource.

It should be noted, if there is a call in place or any other process through which a CG may be provided to the UE 104, the network node 102 may provide the UE 104 with periodic resources (e.g., provide the UE 104 with a schedule and resources that the UE 104 can use for uplink transmissions in the future). In this example, the skipped CG uplink resource may be a one of multiple periodic scheduled resources reserved for the UE for uplink transmission. In such a case, the identified UE port (e.g., TX0) may remain the same, meaning that the UE 104 may use the same port for uplink transmission for the multiple periodic scheduled uplink resources.

At a third communication 508, the UE 104 may transmit a scheduling request (SR) requesting a DG for uplink transmission from the network node 102. In a fourth communication 510, in response to the SR, the network node 102 may transmit a DG to the UE 104 providing the UE 104 with resources for uplink transmission. Over the course of communications, the UE 104 may transmit SRSs to the network node via multiple ports at the UE 104. For example, the UE 104 may transmit a first SRS via a first port (e.g., TX0) and a second SRS via a second port (e.g., TX1). The DG may be transmitted via a DCI message.

As noted, the CG may be configured for the UE 104 to transmit uplink over TX0. However, if after the CG configuration the network node 102 determines that an SRS received via TX1 of the UE 104 is a higher quality signal, then the network node 102 may configure the DG such that the UE 104 transmits the DG uplink using TX1. In such an example, the UE 104 may have to switch between ports for CG and DG uplink transmissions if the CG is configured for TX0 and the DG is configured for TX1. Such a scenario may require additional time between uplink transmissions and additional power consumption at the UE 104 when it switches between ports.

Thus, at a second process 512, the UE 104 may use the DG provided in the fourth communication 510 as an implicit command to update the CG uplink port to match the DG port if the ports of the CG configuration and the DG configuration are different. Accordingly, the UE 104 may update the port used for uplink transmissions from TX0 to TX1.

At a fifth communication 514 the UE 104 may transmit an uplink signal via TX1 in accordance with the DG configuration of the fourth communication 510. At a sixth communication 516, the UE 104 may transmit an uplink communication using CG resources via TX1 despite receiving no explicit command or indication to change the CG port from TX0 to TX1. Instead, the DG of the fourth communication 510 may trigger the UE 104 to switch the CG port from TX0 to TX1 for future CG uplinks.

Figure 6:
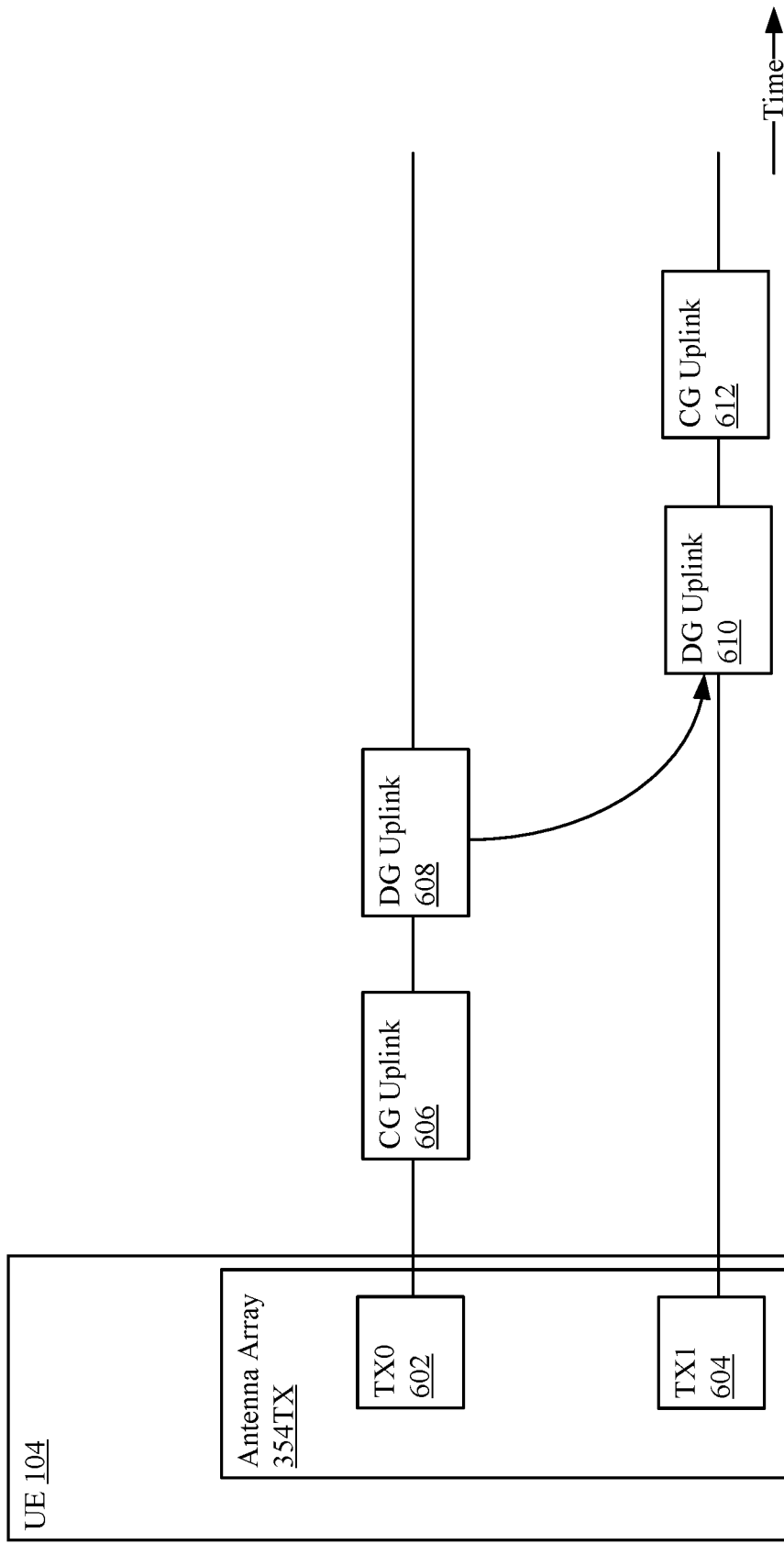
FIG. 6 is a block diagram conceptually illustrating an example timeline within which the UE switches from a first port (e.g., TX0) to a second port (e.g., TX1).

FIG. 6 is a block diagram conceptually illustrating an example timeline within which the UE 104 switches from a first port (e.g., TX0) to a second port (e.g., TX1) for uplink transmissions associated with both DG and CG. In this example, the apparatus may be configured for SISO uplink communications.

The UE 104 transmitter 354TX includes the first port 602 and the second port 604. Initially, the UE 104 may receive, from the network node, a CG configuration indicating a mapping between the first port 602 and a first SRI value, and the second port 604 and a second SRI value. In some examples, the configuration is received via an RRC message. It should be noted that in some examples, the RRC message may activate uplink transmissions according to the CG at the UE 104. However, in other examples, the RRC message may configure the UE 104 for CG uplink transmissions, but the network node may transmit another signal (e.g., a PHY activation via DCI) to the UE 104 to activate uplink transmissions according to the CG configuration.

At a first CG uplink transmission 606, the UE 104 may transmit an uplink signal according to the CG configuration that instructs the UE 104 to transmit via the first port 602. The UE 104 may also transmit a request (e.g., SR) for a DG to the network node. In response to request, the UE 104 may receive, from the network node, a DG for uplink communication via the first port 602 of the UE 104. The UE 104 may then transmit a first uplink signal 608 according to the DG that instructs the UE 104 to transmit the uplink via the first port 602. For example, the DG may be transmitted via a DCI that includes an SRI value that maps to the first port 602.

The UE 104 may then transmit another SR to the network node requesting another DG. In this example, the network node may transmit another DG to the UE 104 instructing the UE 104 to transmit the next uplink signal via the second port 604. For example, the DG may be a DCI having an SRI value that maps to the second port 604.

The UE 104 may then transmit a second uplink signal 610 using the second port 604. However, because the UE 104 is still configured to transmit CG uplink signals via the first port 602, the UE 104 may switch the port used for CG uplink signals to the second port so that uplink signals transmitted for DG and CG are transmitted using the same port. Thus, at a next CG resource, the UE 104 may transmit the CG uplink signal 612 via the second port 604.

Figure 7:
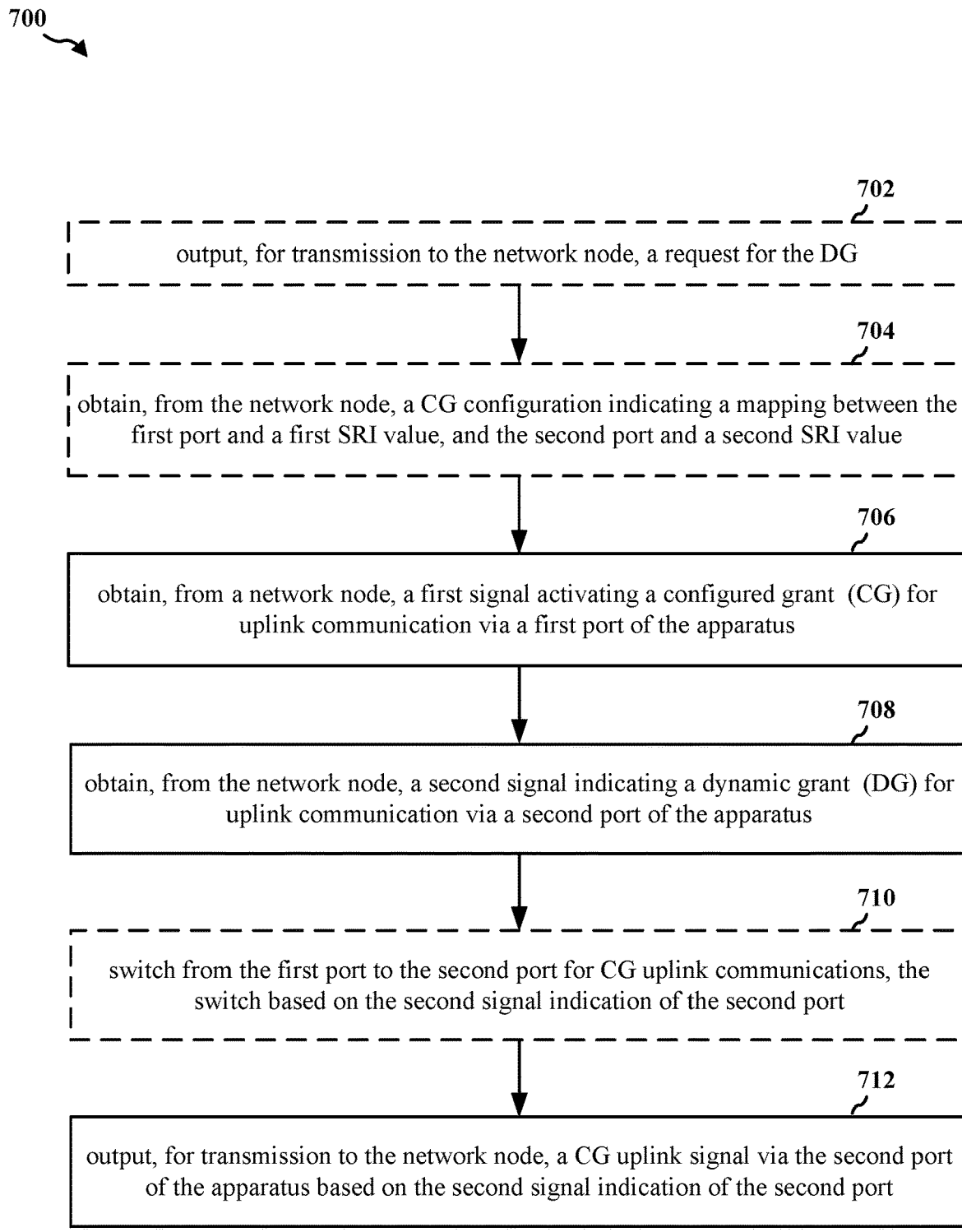
FIG. 7 is a flowchart of a method of wireless communication.

FIG. 7 is a flowchart 700 of a method of wireless communication. The method may be performed by a UE (e.g., the UE 104; the apparatus 1002). At 702, the UE may optionally output, for transmission to the network node, a request for a dynamic grant (DG). For example, 702 may be performed by a transmitting component 840.

At 704, the UE may optionally obtain, from the network node, a CG configuration indicating a mapping between the first port and a first SRI value, and the second port and a second SRI value. For example, 704 may be performed by a receiving component 842.

At 706, the UE may obtain, from a network node, a first signal activating a configured grant (CG) for uplink communication via a first port of the apparatus. For example, 706 may be performed by the receiving component 842.

At 708, the UE may obtain, from the network node, a second signal indicating the DG for uplink communication via a second port of the apparatus. For example, 708 may be performed by the receiving component 842.

At 710, the UE may optionally switch from the first port to the second port for CG uplink communications, the switch based on the second signal indication of the second port. For example, 710 may be performed by a switching component 844.

At 712, the UE may output, for transmission to the network node, a CG uplink signal via the second port of the apparatus based on the second signal indication of the second port. For example, 712 may be performed by a transmitting component 840.

In certain aspects, the first signal is obtained via a downlink control information (DCI) signal, and wherein the DCI signal comprises a sounding reference signal (SRS) resource indicator (SRI) configured to identify the first port for outputting the CG uplink communication.

In certain aspects, the CG configuration is obtained via a radio resource control (RRC) message.

In certain aspects, the apparatus is configured for single-input single-output (SISO) communication.

Figure 8:
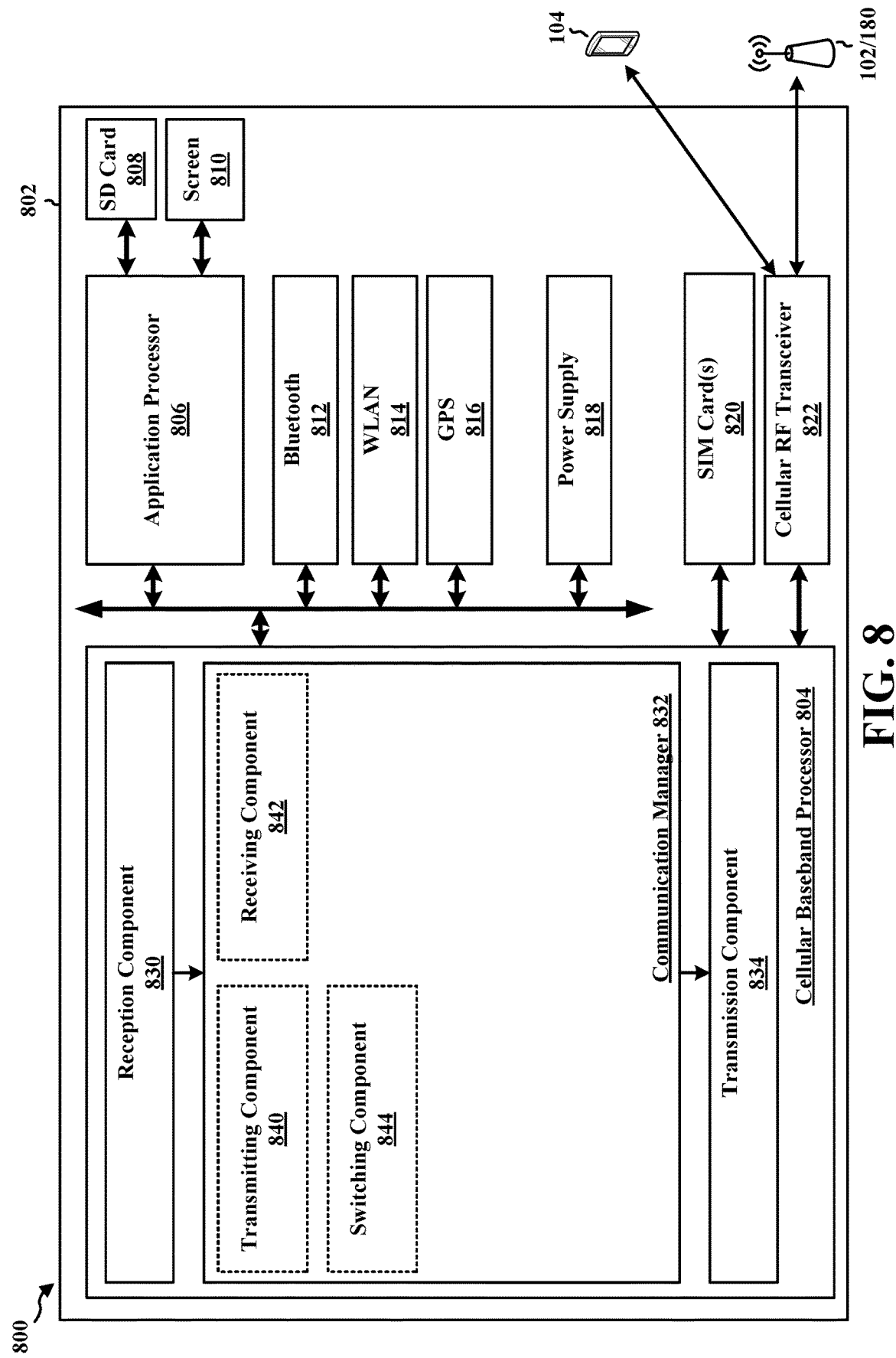
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a transmitting component 840 that is configured to output, for transmission to the network node, a request for the DG; and output, for transmission to the network node, a CG uplink signal via the second port of the apparatus based on the second signal indication of the second port, e.g., as described in connection with FIG. 7.

The communication manager 832 further includes a receiving component 842 configured to obtain, from the network node, a CG configuration indicating a mapping between the first port and a first SRI value, and the second port and a second SRI value; obtain, from a network node, a first signal activating a configured grant (CG) for uplink communication via a first port of the apparatus; obtain, from the network node, a second signal indicating a dynamic grant (DG) for uplink communication via a second port of the apparatus; e.g., as described in connection with FIG. 7.

The communication manager 832 further includes a switching component 844 configured to switch from the first port to the second port for CG uplink communications, the switch based on the second signal indication of the second port, e.g., as described in connection with FIG. 7.

The apparatus may include additional components that perform each of the blocks of the algorithm in the aforementioned flowchart of FIG. 7. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for outputting, for transmission to the network node, a request for the DG; means for obtaining, from the network node, a CG configuration indicating a mapping between the first port and a first SRI value, and the second port and a second SRI value; means for obtaining, from a network node, a first signal activating a configured grant (CG) for uplink communication via a first port of the apparatus; means for obtaining, from the network node, a second signal indicating a dynamic grant (DG) for uplink communication via a second port of the apparatus; means for switching from the first port to the second port for CG uplink communications, the switch based on the second signal indication of the second port; and means for outputting, for transmission to the network node, a CG uplink signal via the second port of the apparatus based on the second signal indication of the second port.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
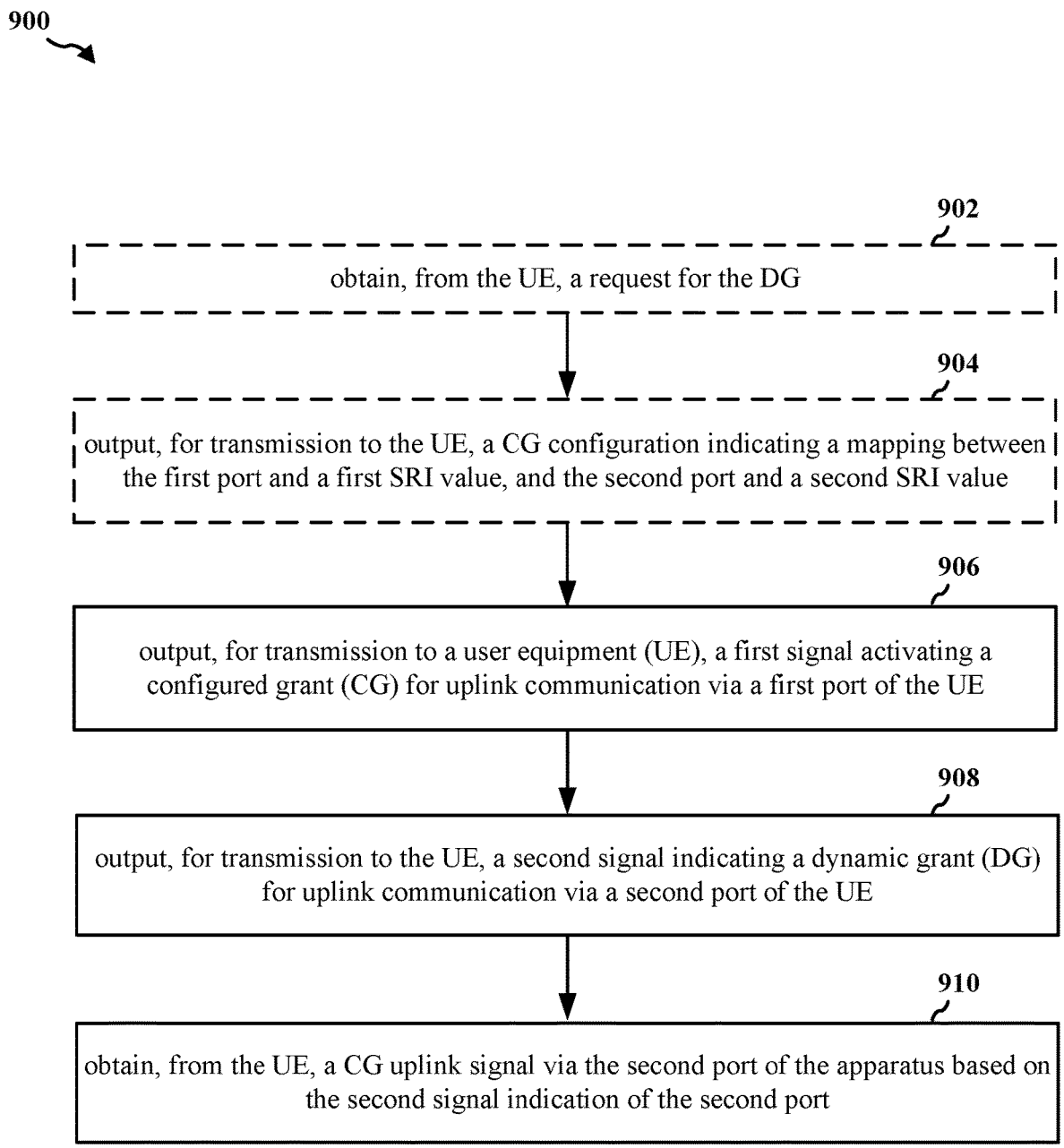
FIG. 9 is a flowchart of a method of wireless communication.

FIG. 9 is a flowchart 900 of a method of wireless communication. The method may be performed by a network node or base station (e.g., the base station 102/180; the apparatus 1002). At 902, the network node may optionally obtain, from the UE, a request for the DG. For example, 902 may be performed by a receiving component 1040.

At 904, the network node may optionally output, for transmission to the UE, a CG configuration indicating a mapping between the first port and a first SRI value, and the second port and a second SRI value. For example, 904 may be performed by a transmitting component 1042.

At 906, the network node may output, for transmission to a user equipment (UE), a first signal activating a configured grant (CG) for uplink communication via a first port of the UE. For example, 906 may be performed by the transmitting component 1042.

At 908, the network node may output, for transmission to the UE, a second signal indicating a dynamic grant (DG) for uplink communication via a second port of the UE. For example, 908 may be performed by the transmitting component 1042.

Finally, at 910, the network node may obtain, from the UE, a CG uplink signal via the second port of the apparatus based on the second signal indication of the second port. For example, 910 may be performed by the receiving component 1040.

In certain aspects, the second signal indication of the second port is configured to switch CG uplink signaling via the first port to the second port.

In certain aspects, the first signal comprises a downlink control information (DCI) signal, and wherein the DCI signal comprises a sounding reference signal (SRS) resource indicator (SRI) configured to identify the first port for outputting the CG uplink communication.

In certain aspects, the CG configuration is output for transmission via a radio resource control (RRC) message.

Figure 10:
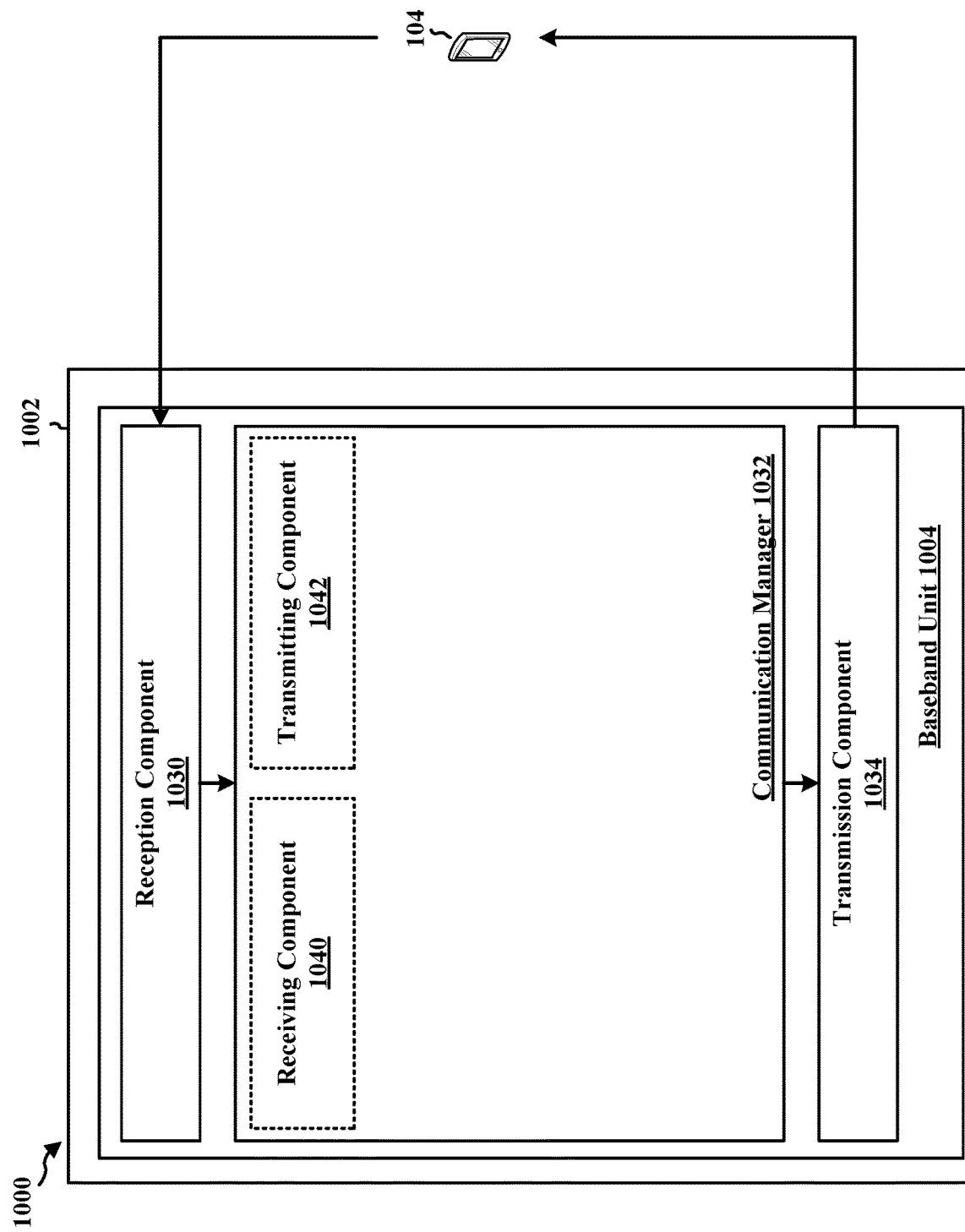
FIG. 10 is a diagram illustrating another example of a hardware implementation for another example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a receiving component 1040 configured to obtain, from the UE, a request for the DG; and obtain, from the UE, a CG uplink signal via the second port of the apparatus based on the second signal indication of the second port; e.g., as described in connection with FIG. 9.

The communication manager 1032 further includes a transmitting component 1042 configured to output, for transmission to the UE, a CG configuration indicating a mapping between the first port and a first SRI value, and the second port and a second SRI value; output, for transmission to a user equipment (UE), a first signal activating a configured grant (CG) for uplink communication via a first port of the UE; and output, for transmission to the UE, a second signal indicating a dynamic grant (DG) for uplink communication via a second port of the UE; e.g., as described in connection with FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for obtaining, from the UE, a request for the DG; means for outputting, for transmission to the UE, a CG configuration indicating a mapping between the first port and a first SRI value, and the second port and a second SRI value; means for outputting, for transmission to a user equipment (UE), a first signal activating a configured grant (CG) for uplink communication via a first port of the UE; means for outputting, for transmission to the UE, a second signal indicating a dynamic grant (DG) for uplink communication via a second port of the UE; means for obtaining, from the UE, a CG uplink signal via the second port of the apparatus based on the second signal indication of the second port.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

Means for receiving or means for obtaining may include a receiver (such as the receive processor 370) or an antenna (s) 320 of the BS 102/180 or the receive processor 356 or antenna(s) 352 of the UE 104 illustrated in FIG. 3. Means for transmitting or means for outputting may include a transmitter (such as the transmit processor 316) or an antenna(s) 320 of the BS 102/180 or the transmit processor 368 or antenna(s) 352 of the UE 104 illustrated in FIG. 3. Means for switching may include a processing system, which may include one or more processors, such as the receive processor 370/356, the transmit processor 316/368, or the controller 359/375 of the BS 102/180 and the UE 104 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method of wireless communication at an apparatus, comprising: obtaining, from a network node, a first signal activating a configured grant (CG) for uplink communication via a first port of the apparatus; obtaining, from the network node, a second signal indicating a dynamic grant (DG) for uplink communication via a second port of the apparatus; and outputting, for transmission to the network node, a CG uplink signal via the second port of the apparatus based on the second signal indication of the second port.

Example 2 is the method of example 1, wherein the method further comprises: switching from the first port to the second port for CG uplink communications, the switch based on the second signal indication of the second port.

Example 3 is the method of any of examples 1 and 2, wherein the first signal is obtained via a downlink control information (DCI) signal, and wherein the DCI signal comprises a sounding reference signal (SRS) resource indicator (SRI) configured to identify the first port for outputting the CG uplink communication.

Example 4 is the method of example 3, wherein the method further comprises: obtaining, from the network node, a CG configuration indicating a mapping between the first port and a first SRI value, and the second port and a second SRI value.

Example 5 is the method of example 4, wherein the CG configuration is obtained via a radio resource control (RRC) message.

Example 6 is the method of any of examples 1-5, wherein the method further comprises: outputting, for transmission to the network node, a request for the DG.

Example 7 is the method of any of examples 1-6, wherein the apparatus is configured for single-input single-output (SISO) communication.

Example 8 is a method of wireless communication at an apparatus, comprising: outputting, for transmission to a user equipment (UE), a first signal activating a configured grant (CG) for uplink communication via a first port of the UE; outputting, for transmission to the UE, a second signal indicating a dynamic grant (DG) for uplink communication via a second port of the UE; and obtaining, from the UE, a CG uplink signal via the second port of the apparatus based on the second signal indication of the second port.

Example 9 is the method of example 8, wherein the second signal indication of the second port is configured to switch CG uplink signaling via the first port to the second port.

Example 10 is the method of any of examples 8 and 9, wherein the first signal comprises a downlink control information (DCI) signal, and wherein the DCI signal comprises a sounding reference signal (SRS) resource indicator (SRI) configured to identify the first port for outputting the CG uplink communication.

Example 11 is the method of example 10, wherein the method further comprises: outputting, for transmission to the UE, a CG configuration indicating a mapping between the first port and a first SRI value, and the second port and a second SRI value.

Example 12 is the method of example 11, wherein the CG configuration is output for transmission via a radio resource control (RRC) message.

Example 13 is the method of any of examples 8-12, wherein the method further comprises: obtaining, from the UE, a request for the DG. Example 14 is a UE, comprising: a transceiver; a memory comprising instructions; and one or more processors configured to execute the instructions and cause the UE to perform a method in accordance with any one of examples 1-7, wherein the transceiver is configured to: receive the first signal; receive the second signal; and transmit the CG uplink signal.

Example 15 is a network node, comprising: a transceiver; a memory comprising instructions; and one or more processors configured to execute the instructions and cause the network node to perform a method in accordance with any one of examples 8-13, wherein the transceiver is configured to: transmit the first signal; transmit the second signal; and receive the CG uplink signal.

Example 16 is an apparatus for wireless communications, comprising means for performing a method in accordance with any one of examples 1-7.

Example 17 is an apparatus for wireless communications, comprising means for performing a method in accordance with any one of examples 8-13.

Example 18 is a non-transitory computer-readable medium comprising instructions that, when executed by an apparatus, cause the apparatus to perform a method in accordance with any one of examples 1-7.

Example 19 is a non-transitory computer-readable medium comprising instructions that, when executed by an apparatus, cause the apparatus to perform a method in accordance with any one of examples 8-13.

Example 20 is an apparatus for wireless communications, comprising: a memory comprising instructions; and one or more processors configured to execute the instructions to cause the apparatus to perform a method in accordance with any one of examples 1-7.

Example 21 is apparatus for wireless communications, comprising: a memory comprising instructions; and one or more processors configured to execute the instructions to cause the apparatus to perform a method in accordance with any one of examples 8-13.

What is claimed is:

1. An apparatus configured for wireless communication, comprising:
   a memory comprising instructions; and
   one or more processors configured to execute the instructions and cause the apparatus to:
      obtain, from a network node, a first signal activating a configured grant (CG) for uplink communication via a first port of the apparatus;
      obtain, from the network node, a second signal indicating a dynamic grant (DG) for uplink communication via a second port of the apparatus; and
      output, for transmission to the network node, a CG uplink signal via the second port of the apparatus based on the second signal indication of the second port.

2. The apparatus of claim 1, wherein the one or more processors are further configured to cause the apparatus to:
   switch from the first port to the second port for CG uplink communications, the switch based on the second signal indication of the second port.

3. The apparatus of claim 1, wherein the first signal is obtained via a downlink control information (DCI) signal, and wherein the DCI signal comprises a sounding reference signal (SRS) resource indicator (SRI) configured to identify the first port for outputting the CG uplink communication.

4. The apparatus of claim 3, wherein the one or more processors are further configured to cause the apparatus to:
   obtain, from the network node, a CG configuration indicating a mapping between the first port and a first SRI value, and the second port and a second SRI value.

5. The apparatus of claim 4, wherein the CG configuration is obtained via a radio resource control (RRC) message.

6. The apparatus of claim 1, wherein the one or more processors are further configured to cause the apparatus to:
output, for transmission to the network node, a request for the DG.

7. The apparatus of claim 1, wherein the apparatus is configured for single-input single-output (SISO) communication.

8. A user equipment (UE), comprising:
a transceiver;
a memory comprising instructions; and
one or more processors configured to execute the instructions and cause the UE to:
receive, via the transceiver, a first signal activating a configured grant (CG) for uplink communication via a first port of the UE;
receive, via the transceiver, a second signal indicating a dynamic grant (DG) for uplink communication via a second port of the UE; and
transmit, via the transceiver, a CG uplink signal via the second port of the UE based on the second signal indication of the second port.

9. The UE of claim 8, wherein the one or more processors are further configured to cause the UE to:
switch from the first port to the second port for CG uplink communications, the switch based on the second signal indication of the second port.

10. The UE of claim 8, wherein the first signal is obtained via a downlink control information (DCI) signal, and wherein the DCI signal comprises a sounding reference signal (SRS) resource indicator (SRI) configured to identify the first port for outputting the CG uplink communication.

11. The UE of claim 10, wherein the one or more processors are further configured to cause the UE to:
receive, via the transceiver, a CG configuration indicating a mapping between the first port and a first SRI value, and the second port and a second SRI value.

12. The UE of claim 11, wherein the CG configuration is obtained via a radio resource control (RRC) message.

13. The UE of claim 8, wherein the one or more processors are further configured to cause the UE to:
transmit, via the transceiver, a request for the DG.

14. An apparatus configured for wireless communication, comprising:
a memory comprising instructions; and
one or more processors configured to execute the instructions and cause the apparatus to:
output, for transmission to a user equipment (UE), a first signal activating a configured grant (CG) for uplink communication via a first port of the UE;
output, for transmission to the UE, a second signal indicating a dynamic grant (DG) for uplink communication via a second port of the UE; and
obtain, from the UE, a CG uplink signal via the second port of the apparatus based on the second signal indication of the second port.

15. The apparatus of claim 14, wherein the second signal indication of the second port is configured to switch CG uplink signaling via the first port to the second port.

16. The apparatus of claim 14, wherein the first signal comprises a downlink control information (DCI) signal, and wherein the DCI signal comprises a sounding reference signal (SRS) resource indicator (SRI) configured to identify the first port for outputting the CG uplink communication.

17. The apparatus of claim 16, wherein the one or more processors are further configured to cause the apparatus to:
output, for transmission to the UE, a CG configuration indicating a mapping between the first port and a first SRI value, and the second port and a second SRI value.

18. The apparatus of claim 17, wherein the CG configuration is output for transmission via a radio resource control (RRC) message.

19. The apparatus of claim 14, wherein the one or more processors are further configured to cause the apparatus to:
obtain, from the UE, a request for the DG.

20. The apparatus of claim 14, further comprising a transceiver configured to:
transmit the first signal;
transmit the second signal; and
receive the CG uplink signal, wherein the apparatus is configured as a network node.

* * * * *